Aug. 18, 1931.  F. W. BAKER  1,819,403
WHEEL RIM
Original Filed Aug. 25, 1926
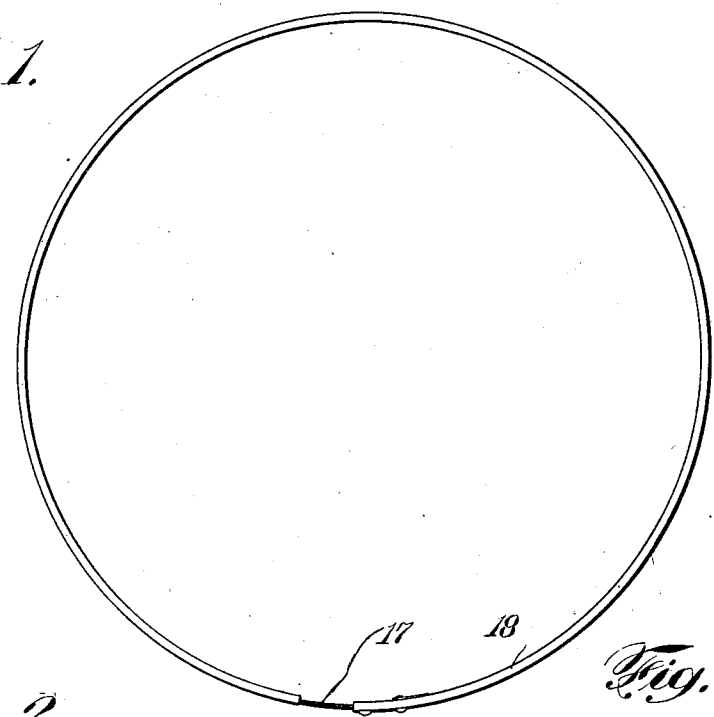
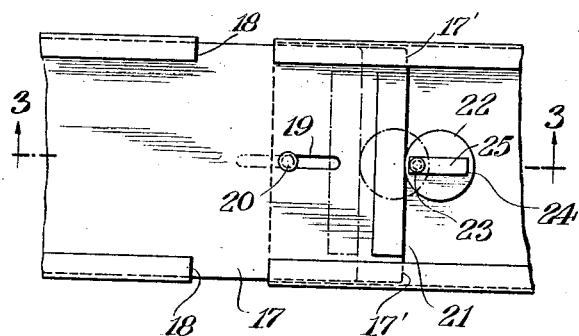
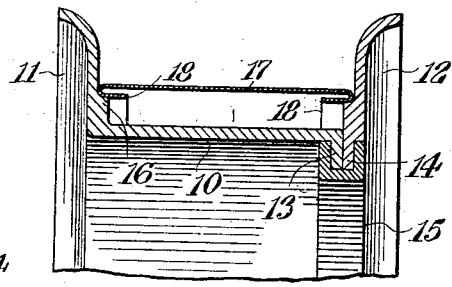
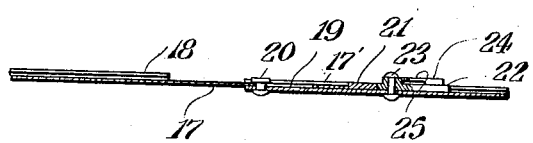
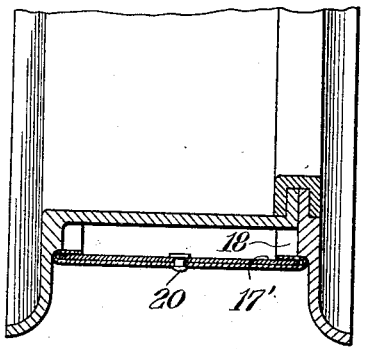
Inventor,
Frederick William Baker.
By his Attorney.
Ramsay Hoguet.

Patented Aug. 18, 1931

1,819,403

UNITED STATES PATENT OFFICE

FREDERICK WILLIAM BAKER, OF OLDSWINFORD, STOURBRIDGE, ENGLAND, ASSIGNOR TO TRINITY WHEEL CORPORATION, OF NEW YORK, N. Y., A CORPORATION OF NEW YORK

WHEEL RIM

Application filed August 25, 1926, Serial No. 131,511. Renewed October 3, 1928.

My invention relates to improvements in wheel rims such as are especially adapted for use on wheels of motor vehicles. My invention is intended to produce a longitudinally adjustable tire bed which is preferably resilient, and which can be conveniently supported on a demountable rim in a manner to be quickly removed without any great effort and without having to release the bed from the rim. My invention is intended further to produce a very simple, and as stated, preferably resilient rim which will afford a suitable bed for the tire, and which if desired can be attached to the tire or tire shoe so that when the tire is removed from the rim the bed will slide off smoothly with it, thus facilitating the easy removal of the tire and its easy replacement.

The invention is also intended to produce a bed which is resiliently seated on the rim, to the end that an elastic bed can be provided for the tire, which will assist in the general resilience of the wheel and springiness of the vehicle without endangering any parts and without carrying the resilience to excess.

The invention is further intended to produce a tire bed which is very strong and simple as well as resilient, which can be easily adjusted in its length to properly fit the rim and tire, and to provide means for seating the bed in spaced relation to the body of the tire rim. These and other advantages will appear from the description which follows.

My invention is an improvement on the structure shown in my application for Letters Patent of the United States filed September 23, 1925, Serial No. 58,136, and shows how a removable tire bed can be resiliently supported on a demountable rim and in spaced relation to the rim back.

Reference is to be had to the accompanying drawings forming a part of this specification, in which similar reference characters indicate corresponding parts in all the views.

Figure 1 is a detail side elevation of the bed removed from the rim.

Figure 2 is a broken plan view of the meeting ends of the bed.

Figure 3 is a longitudinal section on the line 3—3 of Figure 2, and

Figure 4 is a cross section of the demountable rim adapted to receive advantageously the tire bed.

In the drawings I have shown a rather conventional rim 10 having one flange 11 fixed thereto, and the opposite side flange 12 removable. My improved tire bed is applicable to any split rim, that is a rim which has axially separable parts, and the separation is usually near one flange as I have shown in Figure 4. As here illustrated the two parts of the rim have meeting complementary members 13 and 14 which are fastened together by a locking ring 15. I have indicated the means for securing the two parts of the rim together in a general way only, as the invention is not in any way dependent on the means for locking the two parts of the rim together, and any usual or preferred locking means can be used. I prefer, however, to have the flanges 11 and 12 provided with shoulders 16 on their inner sides, so that the band 17 forming the tire bed can be conveniently seated on the shoulders and thus spaced apart from the body 10 of the rim.

The tire bed 17 is longitudinally adjustable and preferably resilient. It can be applied to the tire in any usual way, or when fastened to the tire at the inner part of the tire or shoe, it will stay in place by the simple pressure of the tire upon it.

I also prefer to seat the bed 17 resiliently, and a simple way of attaining this result is to have the side edges of the band 17 turned under as shown at 18 so that these doubled and spaced portions as shown in Figure 4 will correspond to the seating part of the tire bed. The doubling over of the edge portions of the band 17 also makes a simple and convenient keeper for guiding the overlapping ends of the band 17, as one end of the band can project into the keeper thus formed, and be guided in its longitudinal movement as shown clearly at 17'.

The band 17 constituting the tire bed need not be expansible and contractible to a very great extent, and the movement can be limited in any approved way, conveniently by slotting one member of the band as at 19, and providing a rivet or pin 20 on the opposite end of the band which will slide in the slot and be limited by the extent of the slot. The end of the band 17 which enters the keeper of the opposite end is also preferably provided with a thickened abutment 21 which is engaged by a cam or eccentric 22, this being pivoted to one end portion of the band as shown at 23, and having preferably a slightly raised portion 24 to facilitate turning the cam. As a further means of turning it a slot 25 can be made in the raised part 24 of the cam to receive a screw driver or the like. Thus it will be seen that by rotating the cam on its pivot 23, it will act against the abutment 21 and serve to either lengthen or shorten the band 17. Obviously other means might be used to accomplish this result, but the means shown is simple and convenient.

It will be seen that when the flange 12 is removed to provide for removing the tire, the tire bed 17 will be left entirely free without any fastenings whatever, and as it fits snugly against the tire, it will slide off easily with the tire and enable the tire to be removed much more readily than where it is held in the usual way on a fixed bed. It will also be noticed that as the tire is mounted in a bed which is preferably resilient, and the bed is also resiliently seated, the tire has a strong but elastic bed which as shown can be adjusted to properly fit the tire.

I claim:—

1. In combination with a drop center rim, a tire bed comprising a thin, flat, flexible band adapted to lie free in the rim and span the center part thereof, said band having means at its edges forming springy edge portions adapted to seat on the sides of the rim.

2. In combination with a drop center wheel rim, a tire bed comprising a thin, flat, flexible, metallic band adapted to lie free in the rim and to be supported at its edges thereby and span the center part thereof, said band having its edge portions bent over to form springy seating parts.

3. In combination with a wheel rim having shoulders circumferentially arranged on opposite sides of its center, of a freely removable tire bed comprising a thin, flat, flexible, metallic band having means at its edges forming springy edges to seat on the aforesaid shoulders.

4. In combination with a wheel rim having circumferential shoulders on opposite sides of the middle part of the rim, a removable tire bed comprising a thin, flat, flexible, metallic band having its edge portions turned over to form springy seats adapted to rest upon the aforesaid shoulders.

In testimony whereof, I have signed my name to this specification this 19th day of August, 1926.

FREDERICK WILLIAM BAKER.